United States Patent
Byakod et al.

(10) Patent No.: US 10,409,883 B2
(45) Date of Patent: *Sep. 10, 2019

(54) METHOD FOR DETECTING AND ANALYZING SITE QUALITY

(71) Applicant: eBay Inc., San Jose, CA (US)

(72) Inventors: Viraj Byakod, San Jose, CA (US); Thomas Normile, Los Altos, CA (US); Vinoth Amaranathan, San Jose, CA (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/139,336

(22) Filed: Sep. 24, 2018

(65) Prior Publication Data
US 2019/0026297 A1   Jan. 24, 2019

Related U.S. Application Data (63) Continuation of application No. 13/538,934, filed on Jun. 29, 2012, now Pat. No. 10,114,902.

(51) Int. Cl.
*G06F 17/00* (2019.01)
*G06F 16/958* (2019.01)
*G06F 16/955* (2019.01)
*G06Q 10/00* (2012.01)

(52) U.S. Cl.
CPC ........ *G06F 16/958* (2019.01); *G06F 16/9566* (2019.01); *G06Q 10/00* (2013.01)

(58) Field of Classification Search
CPC ............................................... G06F 17/30887
See application file for complete search history.

(56) References Cited

U.S. PATENT DOCUMENTS

| | | |
|---|---|---|
| 8,065,410 B1 | 11/2011 | Breen et al. |
| 8,447,751 B2 | 5/2013 | Stouffer et al. |
| 8,468,597 B1 | 6/2013 | Warner et al. |
| 8,583,482 B2 | 11/2013 | Netzer et al. |
| 8,613,039 B2 | 12/2013 | Chen et al. |
| 10,114,902 B2 | 10/2018 | Byakod et al. |
| 2005/0033683 A1* | 2/2005 | Sacco .................... G06Q 30/06 705/37 |
| 2008/0201228 A1 | 8/2008 | Gillet et al. |
| 2008/0228592 A1 | 9/2008 | Kotas et al. |

(Continued)

OTHER PUBLICATIONS

"U.S. Appl. No. 13/538,934, Non Final Office Action dated Oct. 3, 2014", 16 pgs.

(Continued)

*Primary Examiner* — Mustafa A Amin
(74) *Attorney, Agent, or Firm* — Schwegman Lundberg & Woessner, P.A.

(57) ABSTRACT

A method and system for analyzing sites is described. A scanner module scans listings of an online publication. A quality engine analyzes the quality of the listings. A data collection module collects defective conditions of the listings determined by the quality engine. A report module reports the defective conditions of the listings. An auto correction module automatically corrects at least a first portion of the defective conditions of the listings. A manual correction module enables an operator of the online publication to correct at least a second portion of the defective conditions of the listings.

19 Claims, 6 Drawing Sheets

(56) References Cited

U.S. PATENT DOCUMENTS

| | | | |
|---|---|---|---|
| 2008/0243628 A1* | 10/2008 | Wiseman | G06Q 30/04 705/26.1 |
| 2010/0262601 A1 | 10/2010 | Dumon et al. | |
| 2010/0313266 A1 | 12/2010 | Feng et al. | |
| 2011/0066901 A1 | 3/2011 | Sengupta et al. | |
| 2011/0078047 A1 | 3/2011 | Ruvini et al. | |
| 2011/0106851 A1 | 5/2011 | Swartz | |
| 2011/0238534 A1 | 9/2011 | Yakkala | |
| 2012/0151323 A1 | 6/2012 | Szalai et al. | |
| 2013/0091118 A1 | 4/2013 | Ajoku et al. | |
| 2014/0006927 A1 | 1/2014 | Byakod et al. | |
| 2014/0019285 A1 | 1/2014 | Karthik et al. | |
| 2015/0324879 A1 | 11/2015 | Lu et al. | |

OTHER PUBLICATIONS

"U.S. Appl. No. 13/538,934, Response filed Feb. 3, 2015 to Non Final Office Action dated Oct. 3, 2014", 9 pgs.

"U.S. Appl. No. 13/538,934, Final Office Action dated Jun. 4, 2015", 15 pgs.

"Understanding Common eBay Variation Listing Error Messages", [Online]. Retrieved from the Internet: URLhttp: web.archive.org web 20100118201906 http: ssc.channeladvisor.com howto understanding-common-ebay-variationlisting-error-messages, (Jan. 18, 2010), pp. 1-6.

"U.S. Appl. No. 13/538,934, Response filed Sep. 4, 2015 to Final Office Action dated Jun. 4, 2015", 8 pgs.

"U.S. Appl. No. 13/538,934, Non Final Office Action dated Oct. 2, 2015", 17 pgs.

"U.S. Appl. No. 13/538,934, Response filed Feb. 2, 2016 to Non Final Office Action dated Oct. 2, 2015", 9 pgs.

"U.S. Appl. No. 13/538,934, Final Office Action dated Apr. 21, 2016", 16 pgs.

"U.S. Appl. No. 13/538,934, Response filed Jul. 21, 2016 to Final Office Action dated Apr. 21, 2016", 14 pgs.

"U.S. Appl. No. 13/538,934, Final Office Action dated Sep. 29, 2016", 18 pgs.

"U.S. Appl. No. 13/538,934, Non Final Office Action dated May 26, 2017", 7 pgs.

"U.S. Appl. No. 13/538,934, Response filed Oct. 24, 2017 to Non Final Office Action dated May 26, 2017", 18 pgs.

"U.S. Appl. No. 13/538,934, Final Office Action dated Feb. 12, 2018", 12 pgs.

"U.S. Appl. No. 13/538,934, Examiner Interview Summary dated Mar. 27, 2018", 3 pgs.

"U.S. Appl. No. 13/538,934, Response filed Apr. 9, 2018 to Final Office Action dated Feb. 12, 2018", 15 pgs.

"U.S. Appl. No. 13/538,934, Advisory Action dated Apr. 26, 2018", 3 pgs.

"U.S. Appl. No. 13/538,934, Notice of Allowance dated Jun. 21, 2018", 8 pgs.

"Appeal Decision received for U.S. Appl. No. 13/538,934, mailed on Feb. 21, 2017", (dated Feb. 21, 2017), 2 pages.

* cited by examiner

METHOD FOR DETECTING AND ANALYZING SITE QUALITY

CLAIM OF PRIORITY

This Application is a Continuation of U.S. application Ser. No. 13/538,934, filed Jun. 29, 2012, which is hereby incorporated by reference in its entirety.

TECHNICAL FIELD

This application relates to a computer network system, in particular, to a method and system for detecting and analyzing website quality.

BACKGROUND

The World Wide Web available on the Internet provides a variety of specially formatted documents called web pages. The web pages are traditionally formatted in a language called HTML (HyperText Markup Language). Many web pages include links to other web pages which may reside in the same website or in a different website, and allow users to jump from one page to another simply by clicking on the links. The links use Universal Resource Locators (URLs) to jump to other web pages. URLs are the global addresses of web pages and other resources on the World Wide Web.

Hosted web pages include links that use URLs. However, as web technology evolves, websites have become more and more complex and human error is prone to cause defective web pages that include links that are no longer available. Manual correction of the broken links and other errors on the web pages would take an enormous amount of time.

BRIEF DESCRIPTION OF THE DRAWINGS

The present disclosure is illustrated by way of example, and not by way of limitation, in the figures of the accompanying drawings in which.

DETAILED DESCRIPTION

Although the present invention has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense.

In various embodiments, a method and system for analyzing sites is described. A scanner module scans listings of an online publication. A quality engine analyzes the quality of the listings. A data collection module collects defective conditions of the listings determined by the quality engine. A report module reports the defective conditions of the listings. An auto correction module automatically corrects at least a first portion of the defective conditions of the listings. A manual correction module enables an operator of the online publication to correct at least a second portion of the defective conditions of the listings.

In one embodiment, a publication application generates the online publication comprising listings for an electronic commerce website.

In one embodiment, the quality engine analyzes the listings for defective links, defective images, defective formats, and policy violations of the online publication.

In one embodiment, the report module reports the defective conditions of the listings to the corresponding posting users of the online publication.

In one embodiment, the report module reports the defective conditions of the listings to an operator of the online publication.

In one embodiment, the auto correction module repairs links, images, and formats based on the defective conditions of the listings.

In one embodiment, the auto correction module deletes a listing that violates a policy of the online publication.

In one embodiment, a learning module of the auto correction module learns from the defective conditions of the listings collected by the data collection module.

The scanner module may continuously scan the sites and analyze the sites from a quality standpoint. Some of the things the scanner module detects & analyzes are broken links, images without alt text, descriptions containing external links, policy enforcement violations, broken images, and so forth. In addition, the site quality analyzer collects additional data pertinent to each of the 'bad conditions' in such a way that it is easily fixable by Quality Assurance (QA) and Engineering teams of the network-based publisher 102. An example is providing metadata (like text names for hyperlinks) for the broken links. In another embodiment, the crawl and analysis may be prioritized based on the frequency of the page usage. For example, pages or sites that are accessed the most frequently, are prioritized for the crawl and analysis.

Figure 1:
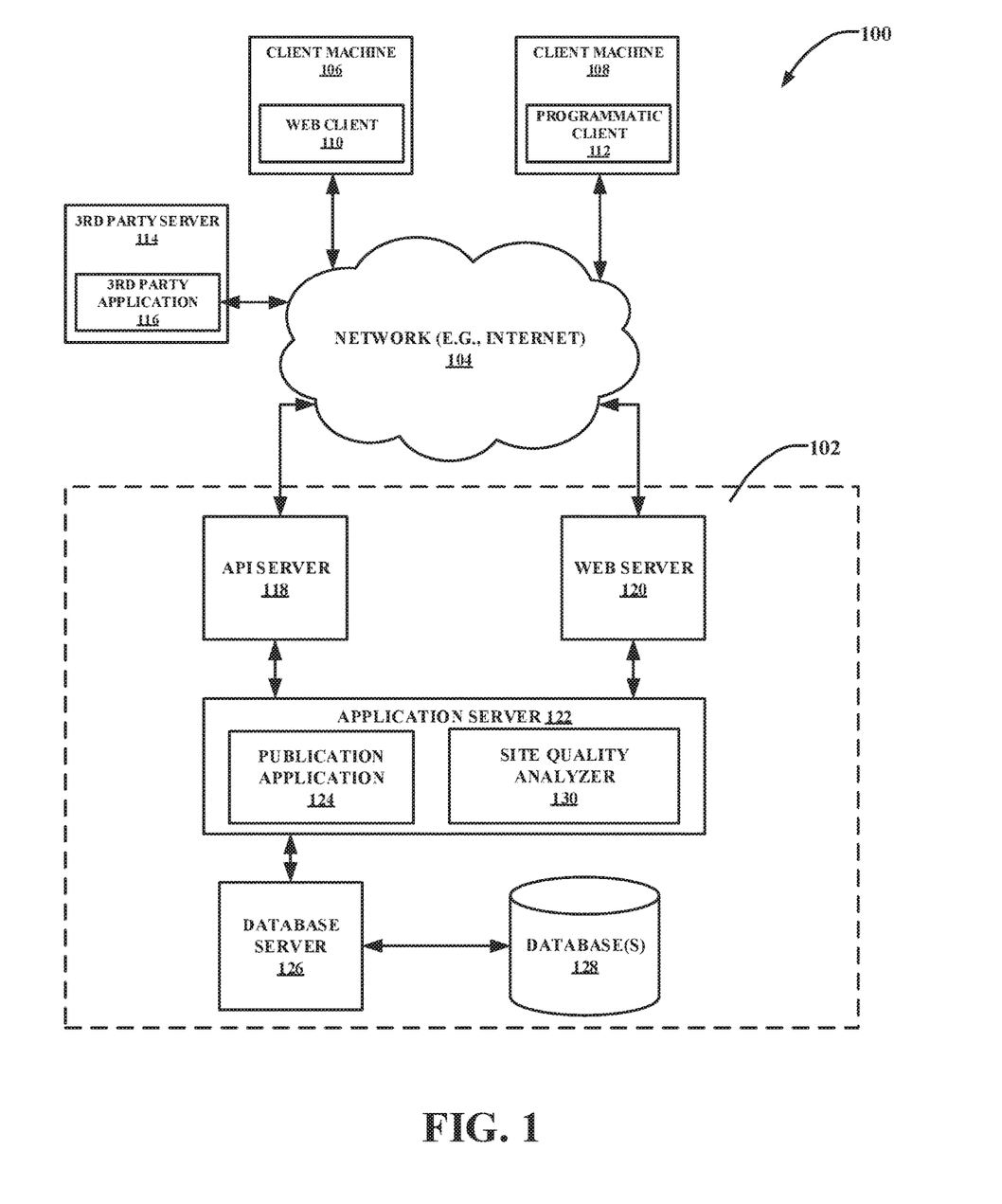
FIG. 1 is a network diagram depicting a network system, according to one embodiment, having a client-server architecture configured for exchanging data over a network.

FIG. 1 is a network diagram depicting a network system 100, according to one embodiment, having a client-server architecture configured for exchanging data over a network. For example, the network system 100 may be a network-based publisher 102 where clients may communicate and exchange data within the network system 100. The data may pertain to various functions (e.g., online item purchases) and aspects (e.g., managing content and user reputation values) associated with the network system 100 and its users. Although illustrated herein as a client-server architecture as an example, other embodiments may include other network architectures, such as a peer-to-peer or distributed network environment.

A data exchange platform, in an example form of a network-based publisher 102, may provide server-side functionality, via a network 104 (e.g., the Internet) to one or more clients. The one or more clients may include users that utilize the network system 100 and more specifically, the network-based publisher 102, to exchange data over the network 104. These transactions may include transmitting, receiving (communicating) and processing data to, from, and regarding content and users of the network system 100. The data may include, but are not limited to, product and service listings associated with buyers and sellers; content and user data such as feedback data; user reputation values; user profiles; user attributes; product and service reviews; product, service, manufacturer, and vendor recommendations and identifiers; auction bids; and transaction data, among other things.

In various embodiments, the data exchanges within the network system 100 may be dependent upon user-selected functions available through one or more client or user interfaces (UIs). The UIs may be associated with a client machine, such as a client machine 106 using a web client 110. The web client 110 may be in communication with the network-based publisher 102 via a web server 120. The UIs may also be associated with a client machine 108 using a programmatic client 112, such as a client application, or a third party server 114 hosting a third party application 116. It can be appreciated that, in various embodiments, the client machine 106, 108, or third party server 114 may be associated with a buyer, a seller, a third party electronic commerce platform, a payment service provider, or a shipping service provider, each in communication with the network-based publisher 102 and optionally each other. The buyers and sellers may be any one of individuals, merchants, or service providers, among other things.

Turning specifically to the network-based publisher 102, an application program interface (API) server 118 and a web server 120 are coupled to, and provide programmatic and web interfaces respectively to, one or more application servers 122. The application servers 122 host one or more applications (a publication application 124 and a site quality analyzer 130). The application servers 122 are, in turn, shown to be coupled to one or more database server(s) 126 that facilitate access to one or more database(s) 128.

In one embodiment, the web server 120 and the API server 118 communicate and receive data pertaining to listings, transactions, and feedback, among other things, via various user input tools. For example, the web server 120 may send and receive data to and from a toolbar or webpage on a browser application (e.g., web client 110) operating on a client machine (e.g., client machine 106). The API server 118 may send and receive data to and from an application (e.g., programmatic client 112 or third party application 116) running on another client machine (e.g., client machine 108 or third party server 114).

The publication application 124 may provide a number of publisher functions and services (e.g., listing, payment, etc.) to users that access the network-based publisher 102. For example, the publication application 124 may provide a number of services and functions to users for listing goods and/or services for sale, facilitating transactions, and reviewing and providing feedback about transactions and associated users. Additionally, the publication application 124 may track and store data and metadata relating to financial transactions among users of the network-based publisher 102. In one embodiment, the listings of products and/or services may include links to external websites, links to media such as pictures and video. The listings may include media content such as photos, audio, and video. The listings may also include metadata associated with the content of the listing. For example, the listing may include key words associated with the content of a corresponding listing.

A third party application 116 may execute on a third party server 114 and may have programmatic access to the network-based publisher 102 via the programmatic interface provided by the API server 118. For example, the third party application 116 may use information retrieved from the network-based publisher 102 to support one or more features or functions on a website hosted by the third party. The third party website may, for example, provide one or more listing, feedback, publisher or payment functions that are supported by the relevant applications of the network-based publisher 102.

The site quality analyzer 130 analyzes listings posted with the publication application 124. In particular, the site quality analyzer 130 scans the listings for defects and can automatically correct some defects in the listings.

Figure 2:
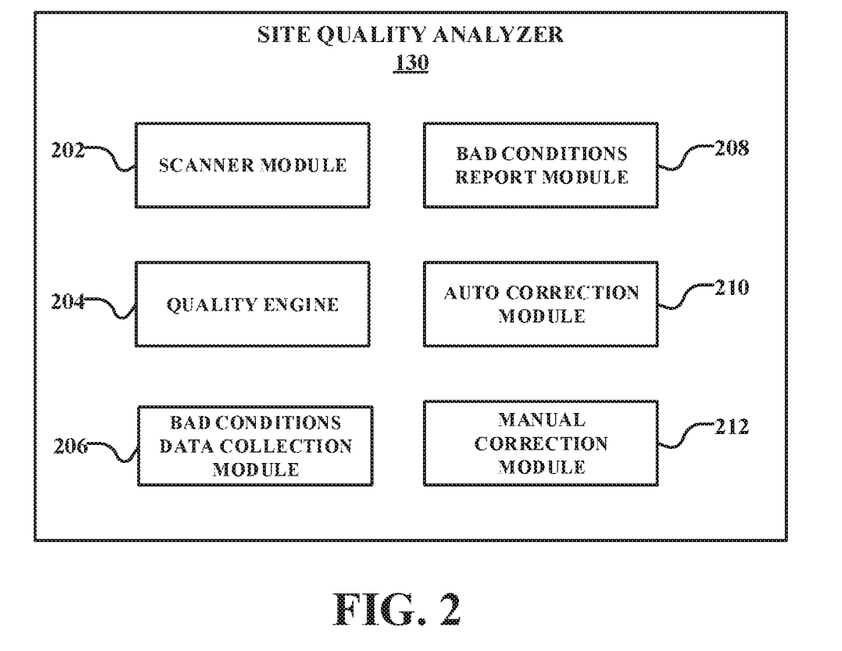
FIG. 2 is a block diagram illustrating an example embodiment of a site quality analyzer.

FIG. 2 is a block diagram illustrating an example embodiment of the site quality analyzer 130. The site quality analyzer 130 has a scanner module 202, a quality engine 204, a bad conditions data collection module 206, a bad conditions report module 208, an auto correction module 210, and a manual correction module 212.

The scanner module 202 scans listings from the online publication. In one embodiment, a web crawler crawls through the different layers of pages published by the publication application 124 to identify the different listings. For example, a listing may include elements such as the title of the listing, the name of an item to be sold, the asking price of the item, a description of the item, pictures of the items, videos of the item. In another embodiment, the scanner module 202 crawls through the listings for site quality (e.g., title, image, description match).

The quality engine 204 analyzes the quality of the listings. For example, the quality engine 204 checks on whether the links in the webpage or site of the listing are defective, whether links to images or other media are valid, whether links to external pages are valid, whether the title of the listing corresponds to the name of the item to be sold in the listing, whether the image displayed in the listing site does not correspond to the item listed, whether the product description is inaccurate, does not match with the listed item, or has typographical errors. Furthermore, in another embodiment, the quality engine 204 may analyze the site of the listing from a search engine optimization perspective to determine how healthy the site is, or whether the site of the listing complies with predefined best practices. Details of the quality engine 204 are described below with respect to FIG. 3.

The bad conditions data collection module 206 collects defective conditions of the listings as determined by the quality engine 204. The defective conditions data include, for example, listings with defective links, defective images, defective formats, and policy violations. The defective conditions data may be stored in a storage device for further analysis and in order to provide data to a learning module.

The bad conditions report module 208 reports the defective conditions of the listings to the corresponding posting users and/or an operator of the publication application 124. For example, the bad conditions report module 208 may notify a posting user of the listing that the title of the listing does not match or correspond to the item being listed. For example, a posting user may have labeled "CD player" as a title and listed and described a DVD player in the listing. In another embodiment, the bad conditions report module 208 may notify an operator of the publication application 124. For example, the operator may be notified if the listing violates a policy of the publication application 124. For example, the operator may be notified when a new listing includes an item for sale that is prohibited by the policy of the publication application 124. Details of the conditions report module 208 are described below with respect to FIG. 4.

The auto correction module 210 automatically corrects at least a first portion of the defective conditions of the listings. The manual correction module 212 enables an operator of the online publication to correct at least a second portion of the defective conditions of the listings. Details of the operation of auto correction module 210 are further described below with respect to FIG. 5.

In another embodiment, the auto correction module 210 is an offline module that works off the data downloaded from the defective web pages after the analysis is performed. A manuals correction may still be required by a web administrator who makes decision to remove defective web pages or listings (based on listing policies).

Figure 3:
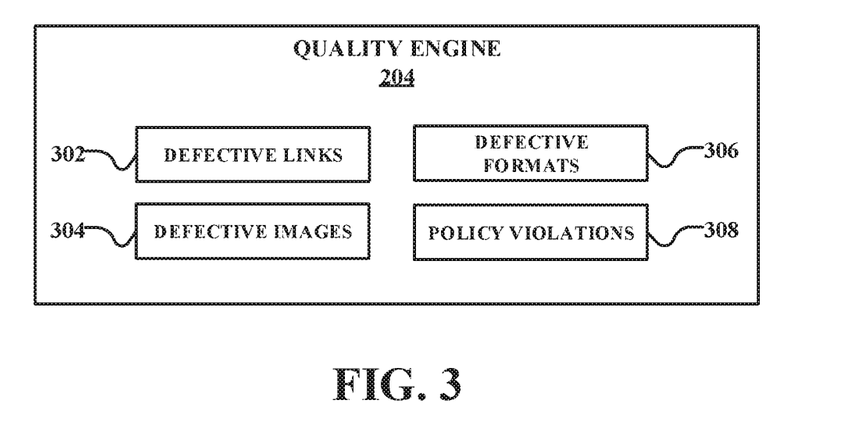
FIG. 3 is a block diagram illustrating an example embodiment of a quality engine.

FIG. 3 is a block diagram illustrating an example embodiment of the quality engine 204 of FIG. 2. The quality engine 204 may include a defective links module 302, a defective images module 304, a defective formats module 306, and a policy violations module 308.

The defective links module 302 of the quality engine 204 checks whether links provided on the listing page are valid. For example, a crawler can click on all web links provided on the listing page one level at a time to determine their validity. In other words, the defective links module 302 identifies broken links located on the listing page.

The defective image module 304 of the quality engine 204 checks for broken images and whether the images on the listing page are valid. The source code of the listing page may include links to images external to the publication application 124. The links for the images may be outdated or defective.

The defective formats module 306 of the quality engine 204 checks for detective formatting of the listing. For example, the listing may include a defective header format or other types of defective data format.

The policy violations module 308 of the quality engine 204 checks for listings that violate a policy of the publication application 124.

In other embodiments, the quality engine 204 may also check for typographical and grammatical errors. The quality engine 204 may include additional modules to determine the level of quality of the site or page of the listing published by the publication application 124.

Figure 4:
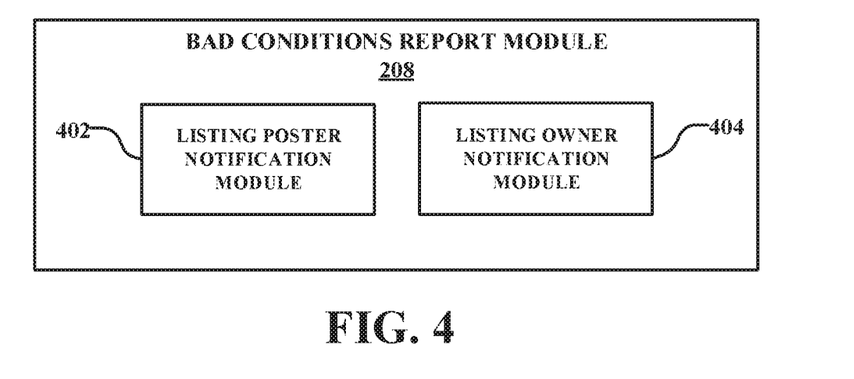
FIG. 4 is a block diagram illustrating an example of a bad conditions report module.

FIG. 4 is a block diagram illustrating an example of the bad conditions report module 208 of FIG. 2. The bad conditions report module 208 includes a listing poster notification module 402 and a listing owner notification module 404.

The listing poster notification module 402 notifies the poster of the listing of the defective listings. For example, the listing poster notification module 402 notifies the posting user of the listing for a DVD player for sale that the image link is broken. In one embodiment, the listing is unpublished or pending while the listing poster notification module 402 notifies the posting user of the defect.

The listing owner notification module 404 notifies an operator of the publication application 124 of the defective listings. The operator of the publication application 124 may be the owner of the publication application 124. For example, the listing owner notification module 404 notifies the operator that a listing violates a policy because it includes items forbidden by the publication application 124. In one embodiment, the listing is unpublished or pending while the listing owner notification module 404 notifies the operator of the publication application 124.

Figure 5:
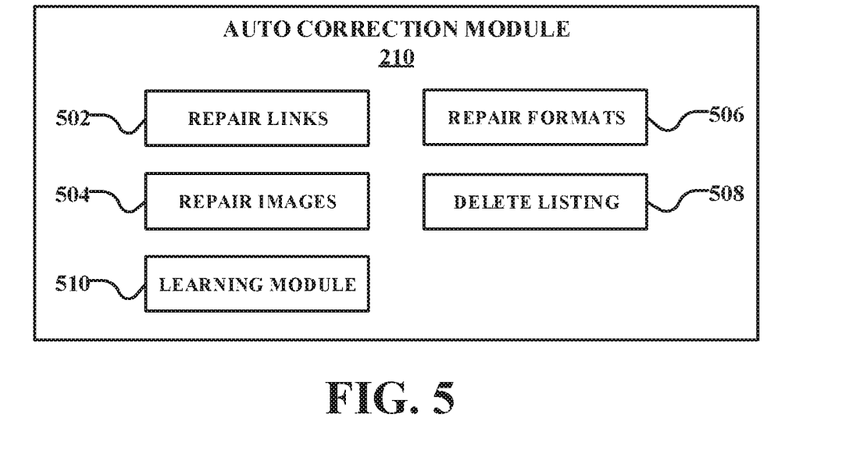
FIG. 5 is a block diagram illustrating an example of an auto correction module.

FIG. 5 is a block diagram illustrating an example of the auto correction module 210 of FIG. 2. The auto correction module 210 includes, for example, a repair links module 502, a repair images module 504, a repair formats module 506, a delete listing module 508, and a learning module 510.

The repair links module 502 automatically repairs defective links as identified by the defective links module 302 of the quality engine 204. In one embodiment, the repair links module 502 determines the correct link using the bad conditions data collected by bad conditions data collection module 206 and/or using the learning module 510.

The repair images module 504 automatically repairs defective or broken images as identified by the defective images module 304 of the quality engine 204. In one embodiment, the repair images module 504 determines the correct images using the bad conditions data collected by bad conditions data collection module 206 and/or using the learning module 510.

The repair formats module 506 automatically repairs defective formats from the listing as identified by the defective formats module 306 of the quality engine 204. In one embodiment, the repair formats module 506 determines the correct format using the bad conditions data collected by bad conditions data collection module 206 and/or using the learning module 510.

The delete listing module 508 of the auto correction module 210 automatically deletes listings that cannot be corrected automatically or listings that violate a policy of the publication application 124. In one embodiment, listings that are not corrected by the posting user within a predetermined amount of time may be deleted.

Figure 6:
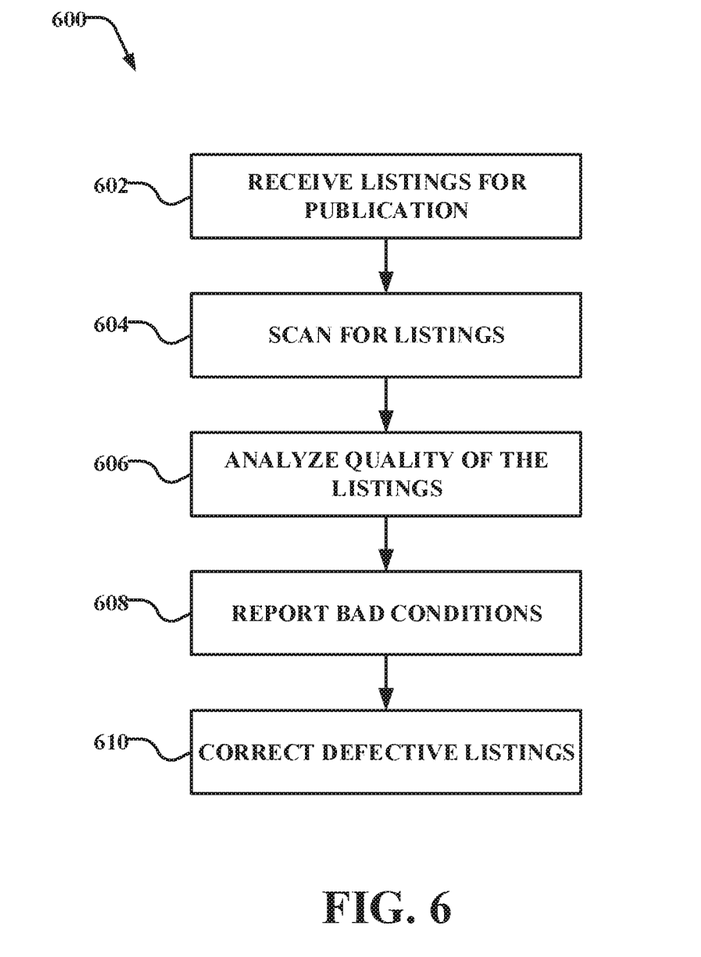
FIG. 6 is a flow chart of an example method for analyzing listing sites in an online publication.

FIG. 6 is a flow chart 600 of an example method for analyzing listing sites in an online publication. At operation 602, the publication application 124 receives listings for publication.

At operation 604, the scanner module 202 scans for listings of an online publication.

At operation 606, the quality engine 204 analyzes the quality of the listings.

At operation 608, the report module 208 reports bad conditions of listings having defects.

At operation 610, the auto correction module 210 automatically corrects the bad conditions in the listings identified with defects, and the manual correction module 212 enables an operator of the online publication to correct at least a second portion of the defective conditions of the listings.

Figure 7:
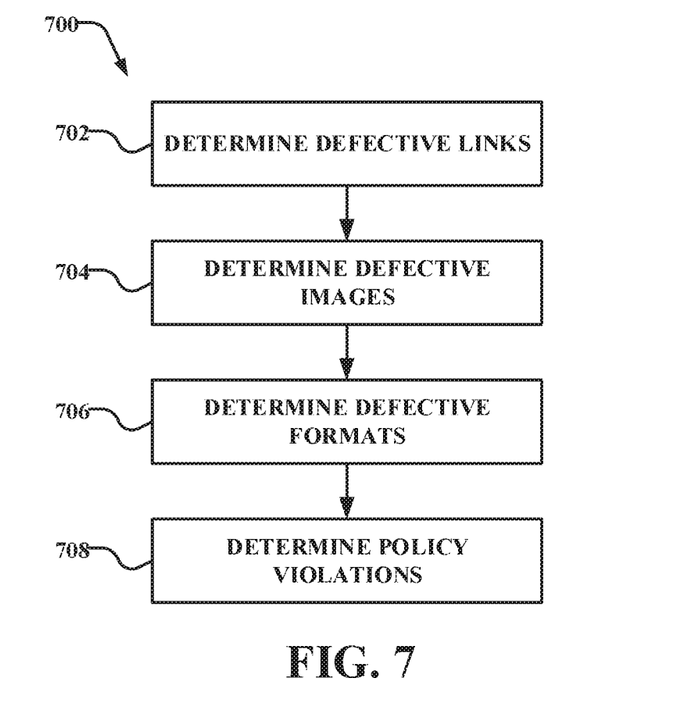
FIG. 7 is a flow chart of an example method for detecting defects in listing sites in an online publication.

FIG. 7 is a flow chart 700 of an example method for detecting defects in listing sites in an online publication. At operation 702, the quality engine 204 analyzes the listings for defective links. At operation 704, the quality engine 204 analyzes the listings for defective images. At operation 706, the quality engine 204 analyzes the listings for defective formats. At operation 708, the quality engine 204 analyzes the listings for policy violations of the online publication.

Figure 8:
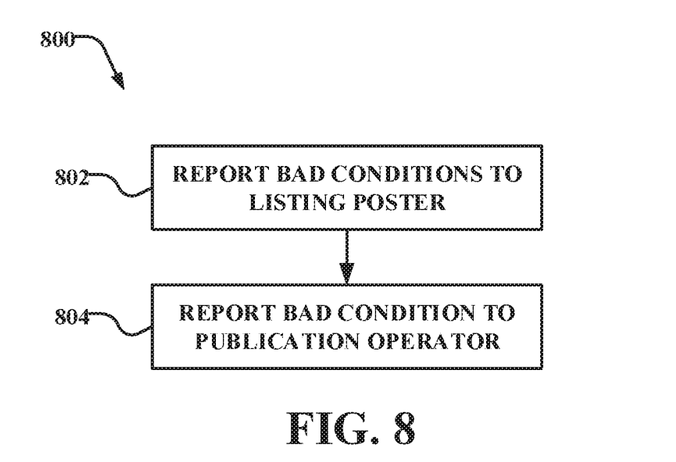
FIG. 8 is a flow chart of an example method for reporting defects in listing sites in an online publication.

FIG. 8 is a flow chart 800 of an example method for reporting defects in listing sites in an online publication. At operation 802, the bad conditions report module 208 reports defective conditions of the listings to the corresponding posting users of the online publication. At operation 804, the bad conditions report module 208 reports defective conditions of the listings to an operator of the online publication.

Figure 9:
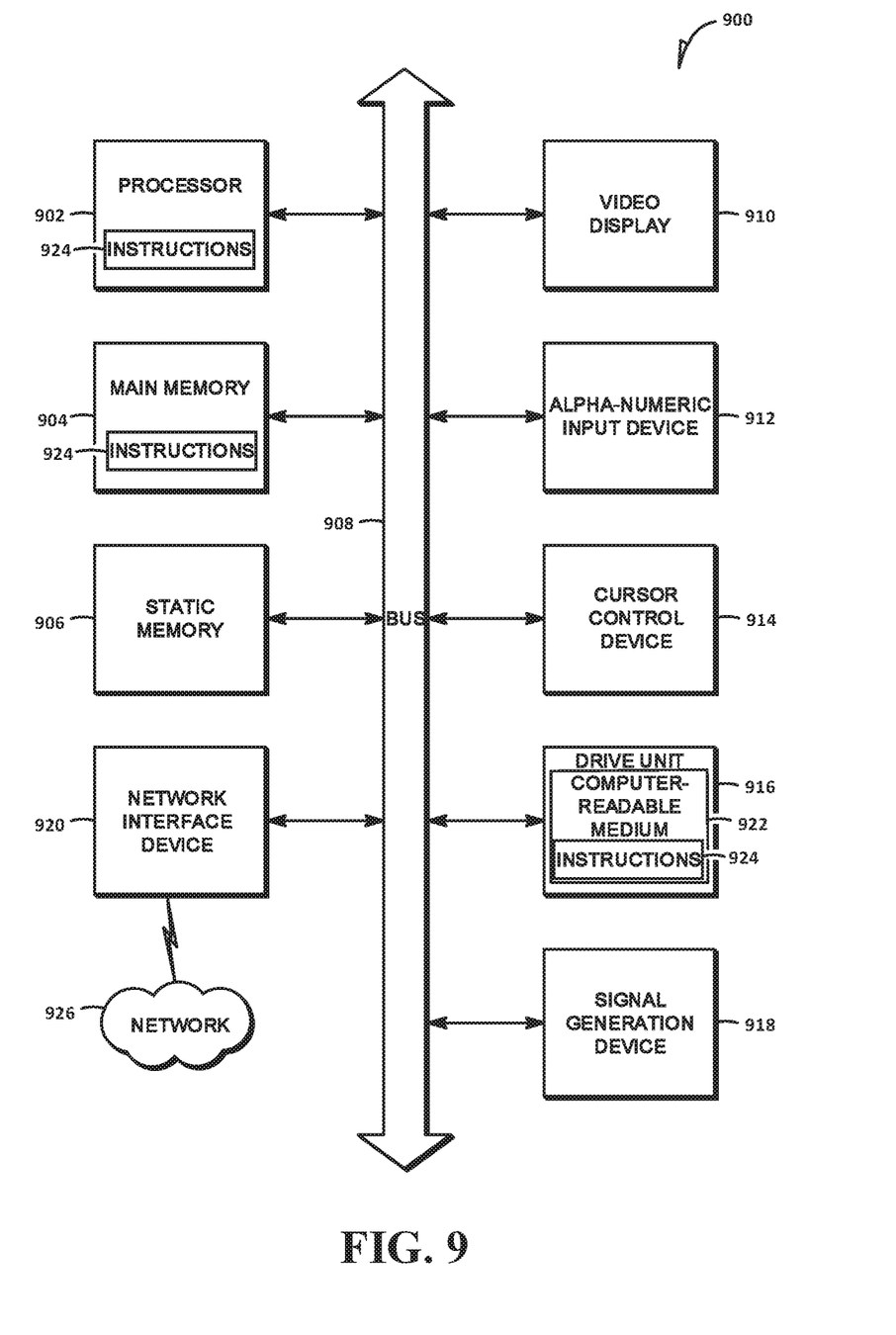
FIG. 9 shows a diagrammatic representation of a machine in the example form of a computer system within which a set of instructions may be executed to cause the machine to perform any one or more of the methodologies discussed herein.

FIG. 9 shows a diagrammatic representation of machine in the example form of a computer system 900 within which a set of instructions may be executed causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU) or both), a main memory 904 and a static memory 906, which communicate with each other via a bus 908. The computer system 900 may further include a video display unit 910 (e.g., a liquid crystal display (LCD) or a cathode ray tube (CRT)). The computer system 900 also includes an alphanumeric input device 912 (e.g., a keyboard), a user interface (UI) navigation device 914 (e.g., a mouse), a disk drive unit 916, a signal generation device 918 (e.g., a speaker) and a network interface device 920.

The disk drive unit 916 includes a machine-readable medium 922 on which is stored one or more sets of instructions and data structures (e.g., instructions 924) embodying or utilized by any one or more of the methodologies or functions described herein. The instructions 924 may also reside, completely or at least partially, within the main memory 904 and/or within the processor 902 during execution thereof by the computer system 900, the main memory 904 and the processor 902 also constituting machine-readable media.

The instructions 924 may further be transmitted or received over a network 926 via the network interface device 920 utilizing any one of a number of well-known transfer protocols (e.g., HTTP).

While the machine-readable medium 922 is shown in an example embodiment to be a single medium, the term "machine-readable medium" should be taken to include a single medium or multiple media (e.g., a centralized or distributed database, and/or associated caches and servers) that store the one or more sets of instructions 924. The term "machine-readable medium" shall also be taken to include any medium that is capable of storing, encoding or carrying a set of instructions 924 for execution by the machine and that cause the machine to perform any one or more of the methodologies of the present invention, or that is capable of storing, encoding or carrying data structures utilized by or associated with such a set of instructions 924. The term "machine-readable medium" shall accordingly be taken to include, but not be limited to, solid-state memories, optical media, and magnetic media.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
   scanning listings of an online publication;
   determining, by at least one processor of a machine, a separate quality level for each listing among the listings based on an analysis of the listings, the analysis including determining whether a title of a listing of an item for sale corresponds to a name of the item and whether a description of the item in the listing matches the name of the item and the title of the listing;
   collecting defective conditions data of the listings based on the determining of whether the title of the listing of the item corresponds to the name of the item and whether the description of the item in the listing matches the name of the item and the title of the listing;
   automatically identifying a portion of the listings that is defective based on the defective conditions data and that is uncorrected for at least a predetermined amount of time; and
   automatically deleting, by the at least one processor of the machine, the portion of the listings after expiration of the predetermined amount of time.

2. The method of claim 1, further comprising:
   generating the online publication comprising the listings.

3. The method of claim 1, further comprising:
   analyzing the listings for a defective image, a defective format, and a policy violation of the online publication.

4. The method of claim 1, further comprising:
   reporting at least some of the defective conditions data of the listings to corresponding posting users of the online publication.

5. The method of claim 1, further comprising:
   reporting at least some of the defective conditions data of the listings to an operator of the online publication.

6. The method of claim 1, further comprising:
   repairing an image, and a format based on at least some of the defective conditions data of the listings.

7. The method of claim 1, further comprising:
   automatically deleting a new listing that violates a policy of the online publication.

8. The method of claim 1, further comprising:
   learning from at least some of the defective conditions data of the listings collected by the data collection module.

9. A. non-transitory computer-readable storage medium storing a set of instructions that, when executed by a processor, cause the processor to perform operations comprising:
   scanning listings of an online publication;
   determining a separate quality level for each listing among the listings based on an analysis of the listings, the analysis including determining whether a title of a listing of an item for sale corresponds to a name of the item and whether a description of the item in the listing matches the name of the item and the title of the listing;
   collecting defective conditions data of the listings based on the determining of whether the title of the listing of the item corresponds to the name of the item and whether the description of the item in the listing matches the name of the item and the title of the listing;

automatically identifying a portion of the listings that is defective based on the defective conditions data and that is uncorrected for at least a predetermined amount of time; and automatically deleting, by the at least one processor of the machine, the portion of the listings after expiration of the predetermined amount of time.

10. The non-transitory computer-readable storage medium of claim 9, further comprising:

generating the online publication comprising the listings;

analyzing the listings for defective an image, a defective format, and a policy violation of the online publication;

reporting at least some of the defective conditions data of the listings to corresponding posting users of the online publication; and reporting at least some of the defective conditions data of the listings to an operator of the online publication.

11. The non-transitory computer-readable storage medium of claim 9, further comprising:

repairing images, and formats based on at least some of the defective conditions data of the listings; and automatically deleting a new listing that violates a policy of the online publication.

12. The non-transit computer-readable storage medium of claim 9, further comprising:

learning from at least some of the defective conditions data of the listings collected by the data collection module.

13. A system, comprising:

a scanner module configured to scan listings of an online publication;

a quality engine configured to determine a separate quality level for each listing among the listings based on an analysis of the listings, the analysis including determining whether a title of a listing of an item for sale corresponds to a name of the item and whether a description of the item in the listing matches the name of the item and the title of the listing;

a data collection module configured to collect defective conditions data of the listings based on the determining of whether the title of the listing of the item corresponds to the name of the item and whether the description of the item in the listing matches the name of the item and the title of the listing; and a delete listings module configured to:

automatically identify a portion of the listings that is defective based on the defective conditions data and that is uncorrected for at least a predetermined amount of time; and automatically delete the portion of the listings after expiration of the predetermined amount of time.

14. The system of claim 13, further comprising a publication application configured to generate the online publication comprising the listings.

15. The system of claim 13, wherein the quality engine is configured to analyze the listings for a defective image, a defective format, and a policy violation of the online publication.

16. The system of claim 13, further comprising a report module configured to report at least some of the defective conditions data of the listings to corresponding posting users of the online publication.

17. The system of claim 13, further comprising a report module configured to report at least some of the defective conditions data of the listings to an operator of the online publication.

18. The system of claim 13, further comprising an auto correction module configured to repair an image, and a format based on at least some of the defective conditions data of the listings.

19. The system of claim 13, wherein the delete listings module is configured to automatically delete a new listing that violates a policy of the online publication.

* * * * *